United States Patent
Yeo

(10) Patent No.: US 7,190,883 B2
(45) Date of Patent: Mar. 13, 2007

(54) SYSTEMS AND METHODS FOR FAST RANDOM ACCESS AND BACKWARD PLAYBACK OF VIDEO FRAMES USING DECODED FRAME CACHE

(75) Inventor: Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/336,530

(22) Filed: Jun. 18, 1999

(65) Prior Publication Data

US 2003/0133694 A1   Jul. 17, 2003

(51) Int. Cl.
*H04N 7/26* (2006.01)
*H04N 5/917* (2006.01)

(52) U.S. Cl. .................. 386/109; 386/46; 345/240.13; 348/699

(58) Field of Classification Search ............... 386/1, 386/27, 33, 46, 105–106, 109, 110–112, 124–126, 386/52; 375/240.12–240.16, 240.22; 348/715, 348/714, 718, 578, 699
See application file for complete search history.

(56) References Cited

U.S. PATENT DOCUMENTS

| | | | |
|---|---|---|---|
| 5,510,899 A | | 4/1996 | Kim |
| 5,742,347 A | * | 4/1998 | Kandlur et al. ........ 375/240.25 |
| 5,768,466 A | | 6/1998 | Kawamura et al. |
| 5,802,242 A | | 9/1998 | Kawamura et al. |
| 5,892,882 A | | 4/1999 | Kuroda et al. |
| 5,959,690 A | * | 9/1999 | Toebes, VIII et al. .. 375/240.15 |
| 6,002,440 A | * | 12/1999 | Dalby et al. ................. 386/110 |
| 6,046,971 A | * | 4/2000 | Ogasawara ................... 386/52 |
| 6,072,830 A | * | 6/2000 | Proctor et al. ......... 375/240.22 |

OTHER PUBLICATIONS

M. Levoy et al. "Light Field Rendering," Proceedings of SIGRAPH 96, Computer Graphics Proceedings, Annual Conference Series, pp. 31-42 (Aug. 1996), Addison Wesley.

(Continued)

*Primary Examiner*—James J. Groody
*Assistant Examiner*—Christopher Onuaku
(74) *Attorney, Agent, or Firm*—Blakely, Sokoloff, Taylor & Zafman LLP

(57) ABSTRACT

In some embodiments, the invention includes a method of processing a video stream. The method involves detecting a request to playback a particular frame. It is determined whether a decoded version of the particular frame is in a decoded frame cache. If it is not, the method includes(i) determining a frame dependency for the particular frame; (ii) determining which of the frames in the frame dependency are in the decoded frame cache; (iii) decoding any frame in the frame dependency that is not in the decoded frame cache and placing it in the decoded frame cache; and (iv) using at least some of the decoded frames in the frame dependency to decode the particular frame to create a decoded version of the particular frame. In some embodiments, the request to playback a particular frame is part of a request to perform frame-by-frame backward playback and the method is performed for successively earlier frames with respect to the particular frame as part of the frame-by-frame backward playback. In some embodiments, the part (i) is performed whether or not it is determined that a decoded version of a particular frame is in the decoded frame cache without part (iv) being performed. Other embodiments are described and claimed.

38 Claims, 2 Drawing Sheets

OTHER PUBLICATIONS

S. Gortler et al. "The Lumigraph," Proceedings of SIGRAPH 96, Computer Graphics Proceedings, Annual Conference Series, pp. 43-54 (Aug. 1996), Addison Wesley.

B. Yeo et al. "Rapid Scene Analysis on Compressed Video," IEEE Transactions on Circuits and Systems for Video Technology, vol. 5, No. 6, Dec. 1995, pp. 533-544.

* cited by examiner

| F1 | F2 | F3 | F4 | F5 | F6 | F7 | F8 | F9 | F10 | F11 | F12 | F13 |
|----|----|----|----|----|----|----|----|----|-----|-----|-----|-----|
| F14 | F15 | F16 | F17 | F18 | F19 | F20 | F21 | F22 | F23 | F24 | F25 | F26 |

SYSTEMS AND METHODS FOR FAST RANDOM ACCESS AND BACKWARD PLAYBACK OF VIDEO FRAMES USING DECODED FRAME CACHE

BACKGROUND OF THE INVENTION

1. Technical Field of the Invention

The present invention relates to systems and methods for random access and backward playback of video frames.

2. Background Art

Video recording has become extremely popular. Traditionally, video tape has been used to record video streams. A video stream is a sequence of frames. In many cases, a VCR (video cassette recorder) is used to playback the video tape. More recently, computers, such as personal computers, have been used to play video streams.

There are various formats of digital video signals. However, popular digital video formats include MPEG (Moving Picture Experts Group) formats. Current and proposed MPEG formats include MPEG-1 ("Coding of Moving Pictures and Associated Audio for Digital Storage Media at up to about 1.5 MBits/s," ISO/IEC JTC 1 CD IS-11172 (1992)), MPEG-2 ("Generic Coding of Moving Pictures and Associated Audio," ISO/IEC JTC 1 CD 13818 (1994); and MPEG-4 ("Very Low Bitrate Audio-Visual Coding" Status: ISO/IEC JTC 1/SC 29/WG 11, 3/1999). There are different versions of MPEG-1 and MPEG-2.

Although video streams are typically played forward, techniques have been developed to play them in the backward direction. Frame-by-frame backward playback refers to playing each frame in a backward sequence (rather than skipping some). A difficulty in playing in the backward direction is that decoding a frame may require use of another decoded frame which has not yet been decoded. One solution is to decode only certain independent frames or a limited number of other frames. This technique is not frame-by-frame and is unsatisfactory in many cases because it results in a loss of detail. Another technique is to decode each frame in a group of pictures before they are needed and then play them in use them as needed. However, this is wasteful in that not all of them might be needed. Still another technique is to decode the frames as needed, but to redecode the frames rather than store them in decoded form for further use. This is likewise wasteful because frames may be repeatedly decoded over a short amount of time.

Accordingly, there is a need for an effective technique for frame-by-frame backward playback.

SUMMARY OF THE INVENTION

In some embodiments, the invention includes a method of processing a video stream. The method involves detecting a request to playback a particular frame. It is determined whether a decoded version of the particular frame is in a decoded frame cache. If it is not, the method includes (i) determining a frame dependency for the particular frame; (ii) determining which of the frames in the frame dependency are in the decoded frame cache; (iii) decoding any frame in the frame dependency that is not in the decoded frame cache and placing it in the decoded frame cache; and (iv) using at least some of the decoded frames in the frame dependency to decode the particular frame to create a decoded version of the particular frame.

In some embodiments, the request to playback a particular frame is part of a request to perform frame-by-frame backward playback and the method is performed for successively earlier frames with respect to the particular frame as part of the frame-by-frame backward playback.

In some embodiments, the part (i) is performed whether or not it is determined that a decoded version of a particular frame is in the decoded frame cache without part (iv) being performed.

Other embodiments are described and claimed.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 3 is an illustration of frames in the order of forward display.

DETAILED DESCRIPTION

Overview

The invention relates to systems and methods for random access and backward playback of video frames.

Figure 1:
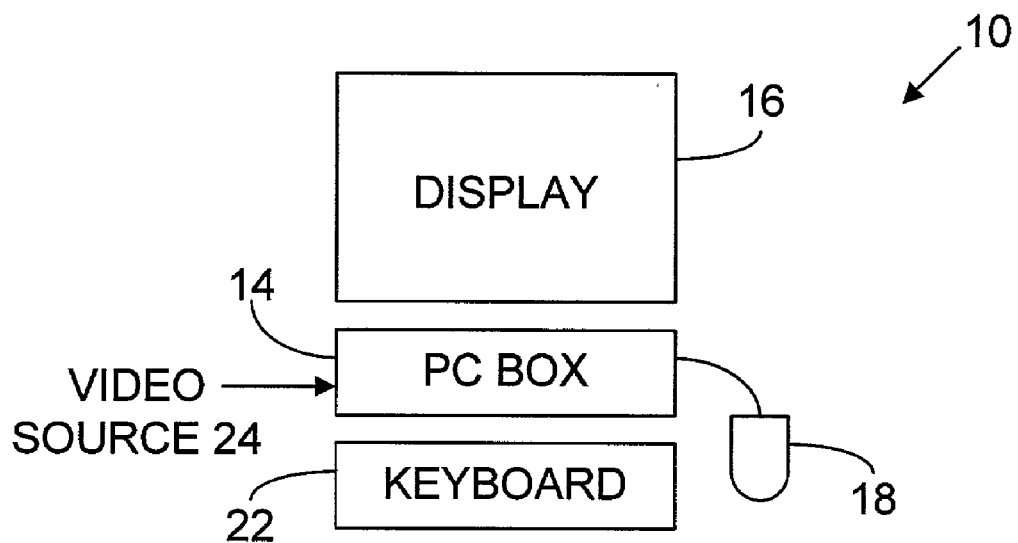
FIG. 1 is a block diagram representation of a computer system that may be used in connection with some embodiments of the invention.

Referring to FIG. 1, a computer system 10 is illustrated as a desk top personal computer, but may be any of a variety of other computers including a portable computer (e.g., laptop), a set top box and a television, a network computer, a mainframe computer, etc. Computer 10 includes chassis 14, a monitor display 16, a mouse 18, and a keyboard 22. Display 16 may be integrated to chassis 14. A video source 24 provides video streams to electronic components in chassis 14. The video streams may be provided in a variety of ways including through a serial conductor directly from a camera, a disc, a modem directly from another computer or through the Internet, or other means.

Figure 2:
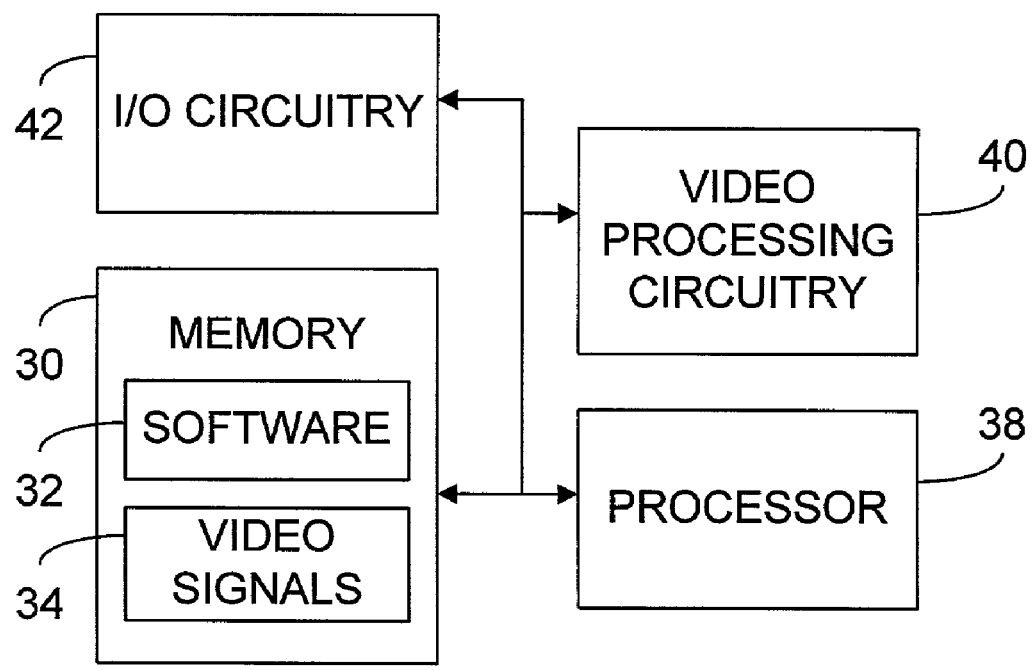
FIG. 2 is a high level schematic block diagram representation of come components of the computer system of FIG. 1.

FIG. 2 illustrates some of the components in chassis 14 in a high level schematic form. Referring to FIG. 2, a memory 30 represents a variety of memory including, for example, a hard drive, main memory, video memory (e.g., video static random access memory (VSRAM)), and a compact disc (CD), if used (which are examples articles including a computer readable medium). For example, memory 30 includes software 32 and video stream signals 34. Memory 30 may also include a database 36 to hold video document detail information and associated query and display software. Software, video stream signals, and other signals, such as control signals, are processed by a processor 38 with the assistance of video processing circuitry 40. Input/output (I/O) circuitry 42 interfaces between the other components of FIG. 2 and, for example, user input devices (e.g., mouse 18 and keyboard 22) and display 16. Examples of user interface devices include a keyboard and one or more other user input devices including, for example, a mouse, joystick, trackball, keyboard, light pen, touch pad, touch screen, gesture recognition mechanism, etc. Again, FIG. 2 is intended to be a high level schematic representation and the invention is not restricted to the particular details therein.

The concepts of random access and frame-by-frame backward playback can be understood with reference to FIG. 3, which represents the order of forward playback of frames F1, F2, ... F26, ..., which are each part of the same video stream. In forward playback, the order the frames are displayed on display 16 is that shown in FIG. 3, namely, F1, then F2, then F3, etc. In frame-by-frame backward playback, successive lower numbered frames are displayed. Backward playback may be initiated through a user input device or other means (e.g., software control). For example, assume that when backward playback is initiated, the current frame to be displayed is frame F10. Then, for frame-by-frame backward playback, the next frames to be displayed are F9, F8, F7, etc. until something indicates that displaying frames of the video stream should stop or the direction is changed. There is backward playback that is other than frame-by-frame backward playback in which not every frame is displayed (e.g., only I frames or only I frames and P frames). For random access playback, the frame displayed can be any frame, rather than merely then next frame. For example, then order of display could be F10, F11, F12, F15, F16, F6, F7. As used herein, random does not mean unpredictable, but rather that any frame within the video stream or a section of the video stream can be accessed. The first frame of a frame-by-frame backward playback is an example of random access.

The invention is not restricted to any particular digital format, but will be described in terms of MPEG video formats. Various formats other than MPEG may be used. The video signals may have interleaved or non-interleaved frames. The invention is applicable to formats having dependencies and those that to not.

Fast Random Access of Frames and Backward Frame-by-Frame Playback

MPEG-1 and MPEG-2 video are made up of three basic frame types: I frames, P frames and B frames. I frames are coded independently of other frames. P frames are coded based on the previous I or P frames. B frames are also known as Bi-directional frames and are coded based on the previous and/or next I or P frames. For MPEG-2 video coded using field coding, B frames may also depend on a different field coded as a B frame. The costs of decompression varies across the different frame types. I frames are cheapest to decode, followed by P frames and then by B frames. To decode P and B frames, motion compensation is required. A B frame is typically more expensive to decode than a P frame because it may depend on two frames whereas a P frame only depends on one frame.

For convenience, the following examples will be described with a 9 frame group of pictures (GOP) (which has 10 frame if the I frame of the next GOP is included). However, the invention is not limited to a particular number of frames in the GOP. For example, a GOP could typically have 15 or 30 frames, or other some other number of frames.

The invention is not restricted to use with frames with any particular resolution or number of bytes. For example, for MPEG1 video (352×240 resolution), the size of one decompressed frame may be ¼ Megabyte (Mbyte) in RGB mode and ⅛ MByte in YUV mode. With greater resolutions, the size can be much greater.

Consider the following pattern of the GOP is the order of displaying frames: I1 (F1), B1 (F2), B2 (F3), P1 (F4), B3 (F5), B4 (F6), P2 (F7), B5 (F8), B6 (F9), I2 (F10). The frame numbers are in parenthesis and the numbers after the frame types are used to distinguish among the different frames with the same encoding type. In contrast to the display order, the encode and decode orders are I1 P1 B1 B2 P2 B3 B4 I2 B1 B2.

1. Random Access

Random access into arbitrary frames of an MPEG video is not straightforward because of frame dependencies. For instance, to access P1, I1 needs to be first decoded; to access B4, which depends on P1 and P2, we will need to first decode I1, P1 and P2.

One approach would be to decode every frame in the GOP so that the needed decoded frames would be available. However, that brute force approach is wasteful. A better approach for random access is to maintain a list of immediate frame dependencies for each frame. The immediate frame dependencies specify the set of frames directly needed for decode operation of the current frame. For the above example, the following are immediate frame dependencies:

I1: none
B1: I1, P1
B2: I1, P1
P1: I1
B3: P1, P2
B4: P1, P2
P2: P1
B5: P2, I2
B6: P2, I2
I2: none (The frame dependencies could be provided by a look-up table, which could be accessed by indices or frame numbers.)

Thus, decoding B5, involves using the decoded P2 and I2 are needed for motion compensation. In addition, decoding P2 involves using the decoded P1, which in return requires the decoded I1. Decoding B5 involves using decoded I1, I2, P1 and P2. Decoding B2 involves using the decoded I1 and P1 for motion compensation; decoding P1 in turns requires decoded I1. B2 therefore requires the decoded I1 and P1. Accordingly, the needed decoded frames are decoded first and stored in memory. Note that in some cases decoded frames will be stored even if they are not going to be displayed themselves, so they will be available in decoding other frames.

2. Frame-by-Frame Backward Playback

Backward (reverse) playback of MPEG video can be straightforwardly implemented using random access techniques. Thus, to access the above 10 frames backward, we could use the random access method above to decode frame 10, then use the random access method to decode frame 9 without taking advantage of the fact that it was already used for decoding frame 10, and so on. This approach, however, does not exploit the temporal coherence of backward decoding. The following is a novel technique to exploit the coherence.

The decoded frames are stored in a decoded frame cache. Various types of memory may be used for the decoded frame cache. Main memory dynamic random access memory (DRAM) is an example. Video random access memory (VRAM) may also be used. A separate memory or section of memory could be dedicated solely to holding the decoded frames. The decoded frame cache does not have to be all in contiguous locations.

The decoded frames cache may be a fixed or variable size. If it is of fixed size it should be large enough to hold the minimum number of decoded frames needed considering the GOPs that may be encountered. The size could dynamically change if the number of frames in the GOP changes. Under one approach, the decoded frames cache is of a fixed size and a when the cache is full, a Least Recently Used (LRU) replacement policy is used to replace the frame that has been least recently accessed. If the cache is not of a fixed size, it could hold a fixed number of frames and a LRU replacement policy could be used.

Using the previous example for a backward decode from frame 10 to 1, the following will happen using the new algorithm on frames 10 to 7:

Frame 10 is the I2 frame. I2 is decoded and stored in the decoded frames cache. Cache=[I2].

Frame 9 is the B6 frame. B6 needs I2, P2, P1 I1. P2, P1, and I1 are decoded. B6 is also decoded. I2 is already in the cache so it does not need to be re-decoded. Decoded P2, P1, I1 and B6 are stored in the cache. Cache=[I2, I1, P1, P2, B6].

Frame 8 is the B5 frame. B5 needs I2 and P2, which are already in the cache. Decode B5 and put in the cache. Cache=[I2, I1, P1, P2, B6, B5]

Frame 7 is the P2 frame. P2 needs P1 which is already decoded. Decode P2 and put in cache. Cache=[I2, I1, P1, P2, B6, B5].

Random access can also be more effectively performed using the above described frame caching technique used in backward playback. The key is to use the same caching mechanism for storing recently decoded frames and to re-use these frames if they are requested in the near future. For instance, the following set of frames may be requested to be decoded: I1, B3, B5. To decode B3, both P1 and P2 are needed. As a result, P1, P2 and I1 will be decoded and placed in the decoded frame cache and used from the decoded frame cache if they were already there. In the next request to decode B5, which depends on P2 and I2, only I2 needs to be decoded since P2 is already in the cache.

The caching technique can be performed through hardware or software control. The technique is described in terms of software pseudo code, but can be implemented in hardware or through software according to different pseudo code. That is, there are a variety of ways to implement the cache technique.

Consider the example I1 (F1), B1 (F2), B2 (F3), P1(F4), B3(F5), B4(F6), P2(F7), B5(F8), B6(F9), I2 (F10), mentioned above.

Assume there are the following two functions (1) DecodeCurrentFrame (N, ReferenceSet) and (2) GetDependencyFrameIndex (N).

In DecodeCurrentFrame (N, ReferenceSet), frame N is decoded according to an MPEG algorithm using frame N and the ReferenceSet. The ReferenceSet is the set of referenced frames needed to decode frame N. For example, ReferenceSet for P1 is {frame 1}, ReferenceSet for B4 is {frame 4, frame 7}. A decoded frame N is returned by the function. The decoded frame may be in RGB, YUV, or another format. RGB is used in the example.

In GetDependencyFrameIndex (N), a list of the reference frames that are needed to decode current frame N is obtained. A list of frame index or indices is returned. For example, e.g., GetDependencyFrameIndex (5)={4, 7}.

In the following pseudo code there is a distinction between the index and the actual frame. For example, 10 is an index and frame 10 is the actual frame. There is an array of a data structure called MPEGFrameCache, which is the decoded frame cache. MPEGFrameCache has two attributes: LastTimeUsed (for using in the LRU technique) and FrameRGB.

The following is pseudo-code (lines 1–22) to implement GetFrame( ) using the caching technique according to some embodiments:

```
1   frame GetFrame(N)
2       SetofDependencyIndex = GetDependencyFrameIndex (N)
3       SetofDependencyFrame = { }
4       /* decode frame in the dependency list if needed */
5       /* decoding also forces the frame to go to the decoded frames cache */
6       for each FrameIndex in SetofDependencyIndex do
7           if frame FrameIndex NOT in MPEGFrameCache then
8               /* this call is recursive */
9               Insert GetFrame (Frame) to SetofDependencyFrame
10          else
11              Retrieve frame indicated by FrameIndex from MPEGFrameCache
12              Insert frame indicated by FrameIndex to SetofDependencyFrame
13              Update LastTimeUsed of frame indicated by FrameIndex in
                    MPEGFrameCache
14          end if
15      end for
16      currentFrame = DecodeCurrentFrame (N, SetofDependencyFrame)
17      if MPEGFrameCache is full then
18          Remove element from MPEGFrameCache with oldest LastTimeUsed
19      endif
20      Insert currentFrame to MPEGFrameCache
21      return currentFrame
22  end
```

With respect to the example given above, the following sequence of events happens to decode backward from frame 10. Assume that MPEGFrameCache is empty.

+ GetFrame (10)
    GetDependencyFrameIndex (10) = { }
    DecodeCurrentFrame (10, { })
    MPEGFrameCache = {frame 10}
+ GetFrame (9)

-continued

```
GetDependencyFrameIndex (9) = {7, 10}
Since frame 7 is not in MPEGFrameCache, call GetFrame (7)
+ GetFrame (7)
    GetDependencyFrameIndex(7) = {4}
    Since frame 4 is not in MPEGFrameCache, call GetFrame (4)
    + GetFrame (4)
        GetDependencyFrameIndex (4) = {1 }
        Since frame 1 is not in MPEGFrameCache, call GetFrame (1)
        + GetFrame (1)
            GetDependencyFrameIndex (1) = { }
            DecodeCurrentFrame (1, { })
            MPEGFrameCache = {frame 1, frame 10}
        DecodeCurrentFrame (4, {1})
        MPEGFrameCache = {frame 1, frame 10, frame 4}
    DecodeCurrentFrame (7, {4})
    MPEGFrameCache = {frame 1, frame 10, frame 4, frame 7}
Frame 10 is already in MPEGFrameCache
DecodeCurrentFrame (9, {7, 10})
MPEGFrameCache = {frame 1, frame 10, frame 4, frame 7, frame 9}
+ GetFrame (8)
    GetDependencyFrameIndex (8) = {7, 10}
    Both Frame 7 and 10 are in the MPEGFrameCache
    DecodeCurrentFrame (8, {7, 10})
    MPEGFrameCache = {frame 1, frame 10, frame 4, frame 7, frame 9, frame 8}
. . .
```

In the above trace, the LastTimeUsed attribute of MPEG-FrameCache is not indicated. However, the LRU technique could be used. Note that the invention is not limited to an LRU technique.

The frames in MPEGFrameCache are not necessarily ordered. Rather than use a recursive call, the above listed pseudo code (lines 1–20) could be modified to include a loop wherein the terminating condition is that all frames on which frame N is dependent have been decoded and are available for use in decoding frame N.

Additional Information and Embodiments Reference in the specification to "some embodiments" or "other embodiments" means that a particular feature, structure, or characteristic described in connection with the embodiments is included in at least some embodiments, but not necessarily all embodiments, of the invention. The various appearances of the term "some embodiments" in the description are not necessarily all referring to the same embodiments.

The term "responsive" and related terms mean that one signal or event is influenced to some extent by another signal or event, but not necessarily completely or directly. If the specification states a component, event, or characteristic "may", "might" or "could" be included, that particular component, event, or characteristic is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method of processing a video stream, comprising:
   (a) detecting a request to randomly access a particular frame;
   (b) maintaining a list of frame dependencies identifying at least a set of frames required to decode the particular frame; and
   (c) determining based at least in part on the list of frame dependencies whether a decoded version of the particular frame is in a decoded frame cache, said cache configured to store an arbitrary number of previously decoded frames, and if it is not and if the particular frame has a frame dependency:
      (i) determining a frame dependency for the particular frame;
      (ii) determining which of the frames in the frame dependency are in the decoded frame cache;
      (iii) decoding any frame in the frame dependency that is not in the decoded frame cache and placing it in the decoded frame cache; and
      (iv) using at least one of the decoded frames in the frame dependency to decode the particular frame to create a decoded version of the particular frame.

2. The method of claim 1, wherein the request to playback a particular frame is part of a request to perform frame-by-frame backward playback and part (c) is performed for successively earlier frames with respect to the particular frame as part of the frame-by-frame backward playback.

3. The method of claim 1, wherein part (i) is performed whether or not it is determined that a decoded version of a particular frame is in the decoded frame cache without part (iv) being performed.

4. The method of claim 1, wherein the particular frame may be an I, P, or B frame of MPEG compressed video.

5. The method of claim 1, wherein the frame dependency is an immediate frame dependency.

6. The method of claim 5, wherein the at least some of the decoded frames referred to in part (iv) are those frames in the immediate dependency.

7. The method of claim 5, wherein part (c) includes recursion where frames in the immediate frame dependency of the frame of interest are not in the decoded frame cache.

8. The method of claim 1, wherein part (c) includes a loop with a terminating condition that all frames on which the particular frame is dependent have been decoded.

9. The method of claim 1, wherein decoded frames are replaced in the decoded frame cache according to a least recently used policy.

10. The method of claim 1, wherein an index is used to represent each frame in the frame dependency.

11. The method of claim 1, wherein the frame dependency is determined through a look-up table.

12. The method of claim 11, wherein the frame dependency is determined through successive uses of a look-up table.

13. The method of claim 1, wherein the decoded frame cache includes a data structure.

14. The method of claim 1, wherein the decoded frame cache includes a section of main memory.

15. An article comprising:
a computer readable medium having instructions thereon which when executed cause a computer to:
  (a) detect a request to randomly access a particular frame; and
  (b) maintaining a list of frame dependencies identifying at least a set of frames required to decode the particular frame;
  (c) determine base at least in part on the list of frame dependencies whether a decoded version of the particular frame is in a decoded frame cache, said cache configured to store an arbitrary number of previously decoded frames, and if it is not and if the particular frame has a frame dependency:
    (i) determine a frame dependency for the particular frame;
    (ii) determine which of the frames in the frame dependency are in the decoded frame cache;
    (iii) decode any frame in the frame dependency that is not in the decoded frame cache and place it in the decoded frame cache; and
    (iv) use at least one of the decoded frames in the frame dependency to decode the particular frame to create a decoded version of the particular frame.

16. The article of claim 15, wherein the request to playback a particular frame is part of a request to perform frame-by-frame backward playback and part (c) is performed for successively earlier frames with respect to the particular frame as part of the frame-by-frame backward playback.

17. The article of claim 15, wherein part (i) is performed whether or not it is determined that a decoded version of a particular frame is in the decoded frame cache without part (iv) being performed.

18. The article of claim 15, wherein the frame dependency is an immediate frame dependency.

19. The article of claim 18, wherein the at least some of the decoded frames referred to in part (iv) are those frames in the immediate dependency.

20. The article of claim 18, wherein part (c) includes recursion where frames in the immediate frame dependency of the frame of interest are not in the decoded frame cache.

21. The article of claim 15, wherein part (c) includes a loop with a terminating condition that all frames on which the particular frame is dependent have been decoded.

22. The article of claim 15, wherein decoded frames are replaced in the decoded frame cache according to a least recently used policy.

23. The article of claim 15, wherein an index is used to represent each frame in the frame dependency.

24. The article of claim 15, wherein the frame dependency is determined through a look-up table.

25. The article of claim 24, wherein the frame dependency is determined through successive uses of a look-up table.

26. A computer system including:
a processor and video processing circuitry;
a display; and
memory including instructions which when executed cause the processor and video processing circuitry to:
  (a) detect a request to randomly access a particular frame; and
  (b) maintain a list of frame dependencies identifying at least a set of frames required to decode the particular frame;
  (c) determine whether a decoded version of the particular frame is in a decoded frame cache, said cache configured to store an arbitrary number of previously decoded frames, and if it is not and if the particular frame has a frame dependency:
    (i) determine a frame dependency for the particular frame;
    (ii) determine which of the frames in the frame dependency are in the decoded frame cache;
    (iii) decode any frame in the frame dependency that is not in the decoded frame cache and place it in the decoded frame cache; and
    (iv) use at least one of the decoded frames in the frame dependency to decode the particular frame to create a decoded version of the particular frame,
  (d) provide the decoded version of the particular frame for displaying on the display.

27. A method for randomly accessing a first frame of a video stream, comprising:
maintaining a list of frame dependencies identifying at least a set of frames required to decode the first frame;
determining a decoding of the first frame is not in a decoded frame cache, said cache configured to store an arbitrary number of previously decoded frames;
determining, based at least in part on the list of frame dependencies, a first frame dependency for the first frame comprising frames required to decode the first frame;
decoding at least one of the frames of the frame dependency not present in the decoded frame cache, and placing it in the decoded frame cache; and
decoding the first frame using at least one of the decoded frames in the decoded frame cache.

28. The method of claim 27, further comprising:
decoding each frame of the frame dependency not present in the decoded frame cache, and placing them in the decoded frame cache.

29. The method of claim 27, further comprising:
recursively decoding the second frame of the frame dependency.

30. A method according to claim 27 for reverse playback of frames of the video stream, comprising:
determining a second frame is not in the decoded frame cache, the second frame following the first frame in the video stream;
determining a second frame dependency for the second frame comprising frames required to decode the second frame;
decoding at least one of the frames of the frame dependency not present in the decoded frame cache, and placing it in the decoded frame cache; and
decoding the second frame using at least one of the decoded frames in the decoded frame cache.

31. The method of claim 30, further comprising:
playing the second frame and then the first frame.

32. The method of claim 30, wherein the second frame is an immediately following frame of the first frame.

33. An article comprising a machine-accessible media having associated data for randomly accessing a first frame of a video stream, wherein the data, when accessed, results in a machine performing:

maintaining a list of frame dependencies identifying at least a set of frames required to decode the first frame;

determining a decoding of the first frame is not in a decoded frame cache, said cache configured to store an arbitrary number of previously decoded frames; determining, based at least in par on the list of frame dependencies, a first frame dependency for the first frame comprising frames required to decode the first frame;

decoding at least one of the frames of the frame dependency not present in the decoded frame cache, and placing it in the decoded frame cache; and decoding the first frame using at least one of the decoded frames in the decoded frame cache.

34. The article of claim 33 wherein the machine-accessible media further includes data, when accessed, results in the machine performing:

decoding each frame of the frame dependency not present in the decoded frame cache, and placing them in the decoded frame cache.

35. The article of claim 33 wherein the machine-accessible media further includes data, when accessed, results in the machine performing:

recursively decoding the second frame of the frame dependency.

36. The article of claim 33 wherein the machine-accessible media further includes data for reverse playback of frames of the video stream, when accessed, results in the machine performing:

determining a second frame is not in the decoded frame cache, the second frame following the first frame in the video stream;

determining a second frame dependency for the second frame comprising frames required to decode the second frame;

decoding at least one of the frames of the frame dependency not present in the decoded frame cache, and placing it in the decoded frame cache; and decoding the second frame using at least one of the decoded frames in the decoded frame cache.

37. A method of caching decoded frames of a video in a decoded frame cache configured to store an arbitrary number of previously decoded frames, comprising:

maintaining a list of frame dependencies identifying at least a set of frames required to decode a particular frame of the video;

determining based at least in part on the list of frame dependencies that a decoded version of the particular frame is not in the decoded frame cache; and determining if the particular frame has a frame dependency, and if so:

determining a frame dependency for the particular frame, determining which of the frames in the frame dependency are in the decoded frame cache, decoding any frame in the frame dependency that is not in the decoded frame cache and placing it in the decoded frame cache, and using at least one of the decoded frames in the frame dependency to decode the particular frame to create a decoded version of the particular frame.

38. The method of claim 37, further comprising:

detecting a request to randomly access the particular frame;

wherein the request to playback the particular frame is part of a request to perform frame-by-frame backward playback.

* * * * *